United States Patent [19]
Barthalon et al.

[11] 3,915,093
[45] Oct. 28, 1975

[54] SUSPENDED VEHICLE PROPULSION AND SUSPENSION SYSTEM

[75] Inventors: Maurice Barthalon, Verrieres-Le-Buisson; Jean Guy, Lyon, both of France

[73] Assignee: Maurice Barthalon, Verrieres Le Buisson, France

[22] Filed: May 10, 1974

[21] Appl. No.: 468,881

Related U.S. Application Data

[63] Continuation of Ser. No. 284,072, Aug. 28, 1972, abandoned.

[52] U.S. Cl. ................ 104/89; 104/108; 104/134; 104/148 LM; 105/149; 105/150
[51] Int. Cl.² ........................................ B61B 3/02; B61B 13/08; B61C 13/04; H02K 41/02
[58] Field of Search ......... 104/89, 94, 95, 108, 134, 104/148 LM; 105/149, 150, 153, 453

[56] References Cited
UNITED STATES PATENTS

| | | | |
|---|---|---|---|
| 2,018,087 | 10/1935 | Plass | 105/153 |
| 3,106,171 | 10/1963 | Julien | 104/94 |
| 3,361,084 | 1/1968 | Ellzey | 105/150 |
| 3,511,186 | 5/1970 | Barthalon | 104/89 |
| 3,525,306 | 8/1970 | Edel et al. | 105/150 X |
| 3,534,689 | 10/1970 | Barthalon | 104/89 |
| 3,631,806 | 1/1972 | Barthalon | 105/150 X |

FOREIGN PATENTS OR APPLICATIONS

| | | | |
|---|---|---|---|
| 91,423 | 4/1968 | France | 105/150 |
| 93,421 | 2/1969 | France | 105/150 |
| 1,072,538 | 3/1954 | France | 105/150 |
| 1,228,243 | 3/1960 | France | 105/150 |
| 1,356,455 | 2/1964 | France | 105/150 |
| 1,474,851 | 2/1967 | France | 105/150 |

*Primary Examiner*—M. Henson Wood, Jr.
*Assistant Examiner*—Howard Beltran
*Attorney, Agent, or Firm*—Young & Thompson

[57] ABSTRACT

The invention is a suspension system for a carriage suspended from an overhead track. Resilient elements in the suspension each comprise a deformable chamber filled with pressure fluid. Fluid is distributed between the chambers to effect curve negotiation.

44 Claims, 11 Drawing Figures

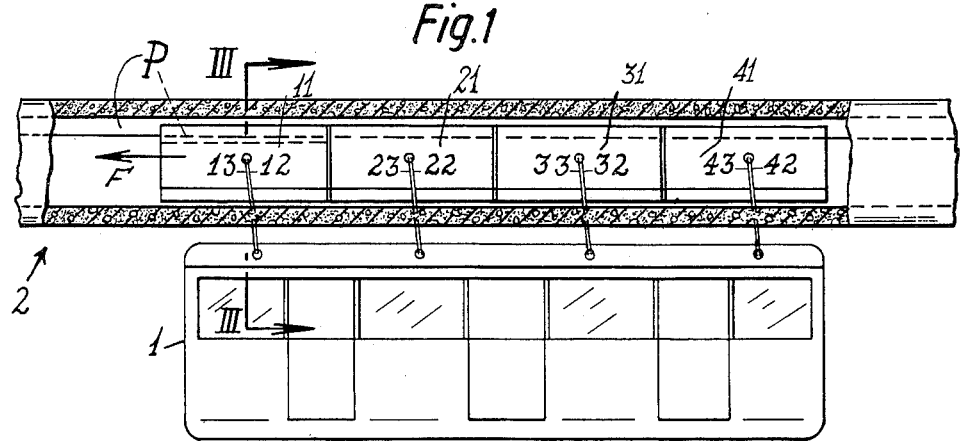
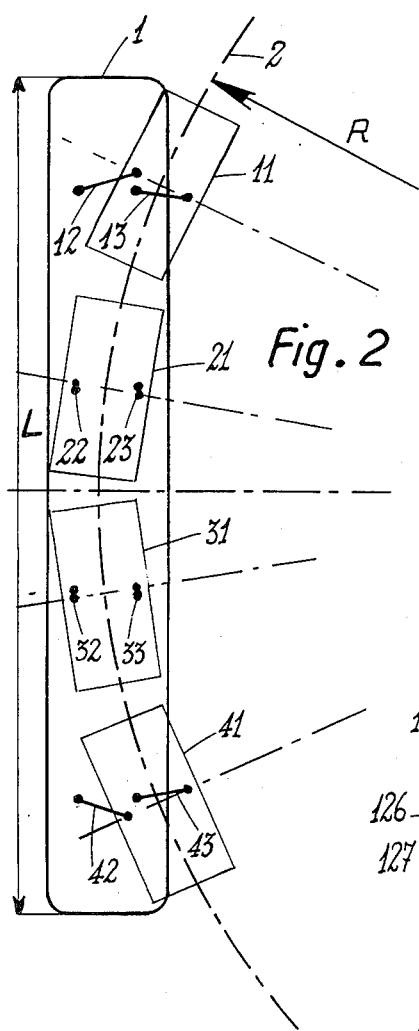
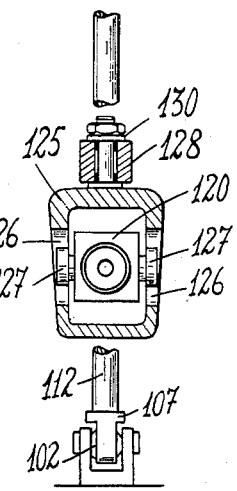
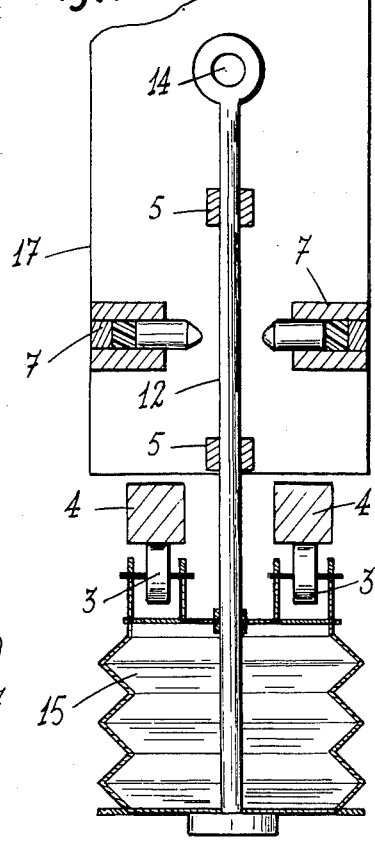

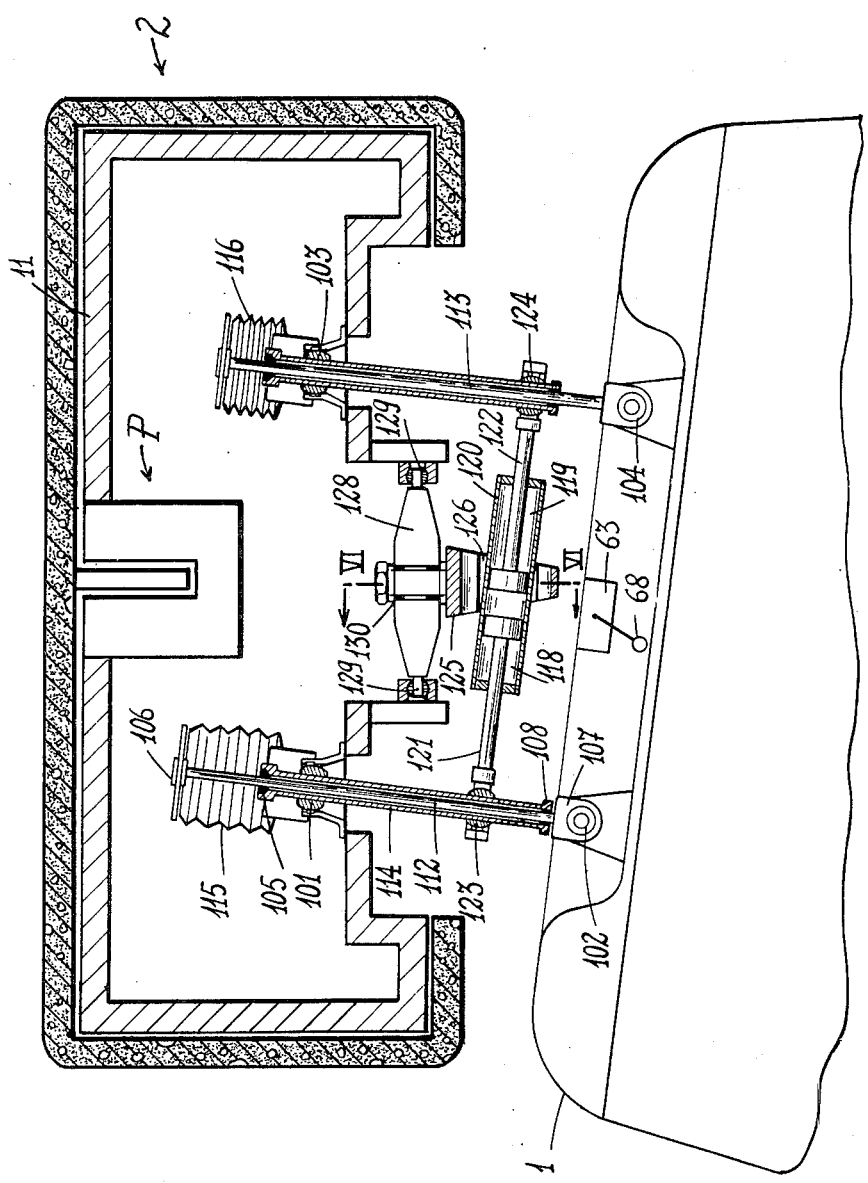

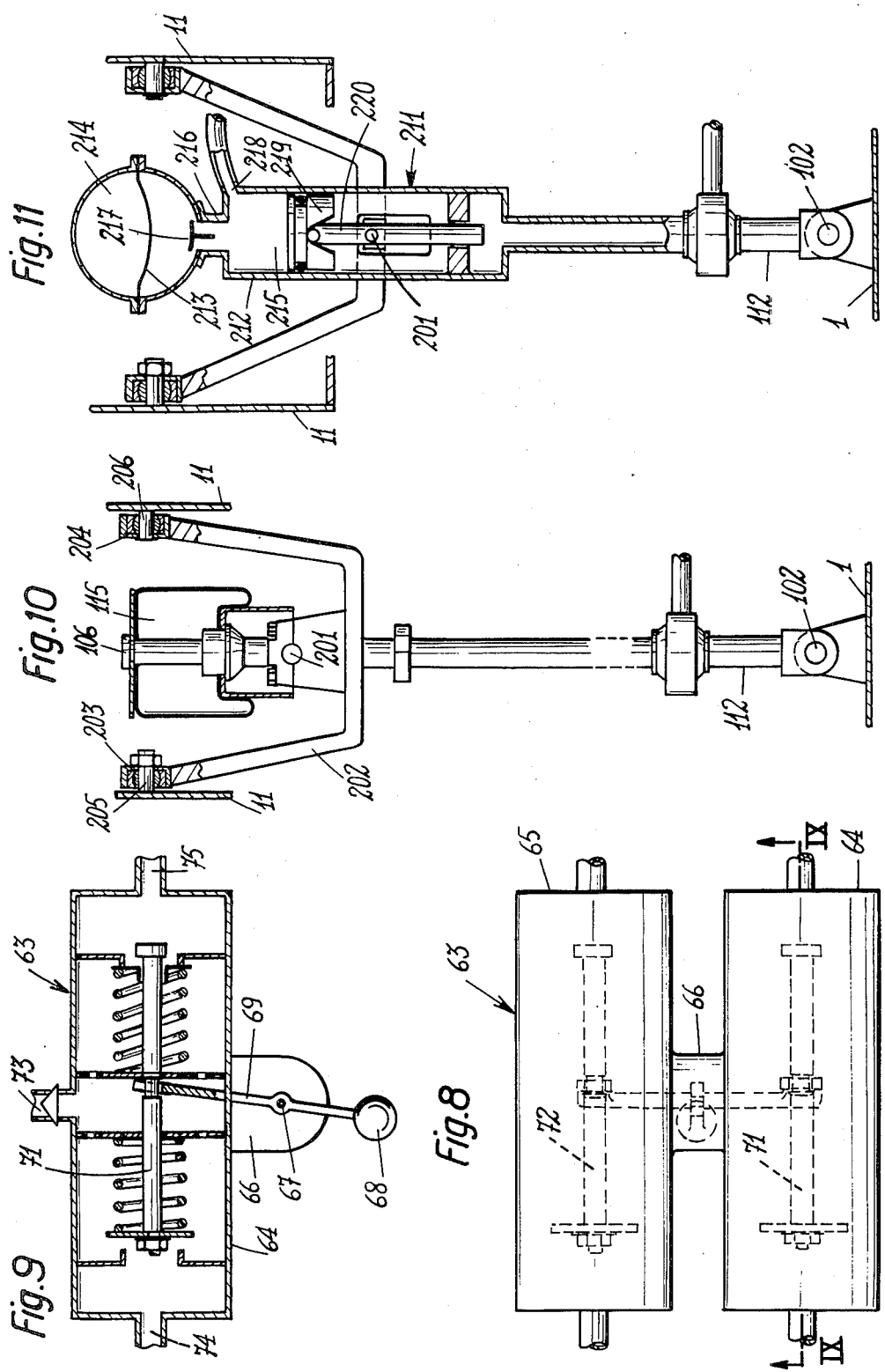

SUSPENDED VEHICLE PROPULSION AND SUSPENSION SYSTEM

This application is a continuation of copending application Ser. No. 284,072, filed Aug. 28, 1972, now abandoned.

This invention relates to a suspension system for a vehicle guided by a track and comprising firstly a succession of blocks which are movable along the said track and secondly a cabin situated beneath said track.

The invention is applicable to vehicles in which the cabin is suspended from movable blocks mounted on wheels, such as trolleys or bogies, or bearing on the track by use of other known means.

It is particularly suitable for conveyors of the suspended vehicle type comprising a vacuum lift system as disclosed in the French Pat. No. 1,474,851 and the two additions to the French Pat. No. 91 423 and 93 421, filed by Maurice Barthalon.

It is known, more particularly from patents taken out by the Societe Anonyme Francaise d'Etudes, de Gestion et d'Entreprises in France under the French Pat. Nos. 1,072,538, 1,228,243 and 1,356,455, and in the U.S.A. under the U.S. Pat. No. 3,106,171, to suspend a cabin from trolleys which move along a track serving both as a support and a guide, the suspension means comprising resilient members if required. However, the systems referred to in these patents do not allow the points of attachment of the suspensions to the cabins to be disposed to the maximum advantage, and do not allow the number thereof to be increased; neither do they provide control of the distribution of the forces applied to them, and this has considerable disadvantages when the cabins are long and/or heavily loaded.

According to the said patent of addition French Pat. No. 93 421, the means for suspending the cabin from the movable blocks which, in this case, are in the form of slides, may comprise resilient pull rods. These rods may also be inclined relatively to the central plane and include oleo-pneumatic shock-absorbers. The effect of these arrangements is more particularly to improve the behaviour of the vehicle on bends and hence enable a track to be used with curves of a smaller diameter than previously. Despite these improvements, the forces transmitted to the movable blocks by the cabin suspension means still have appreciable lack of uniformity from one attachment point to another. The said forces originate firstly from the lift or guidance functions performed by the track with respect to the movable blocks and secondly the oscillations imparted to the cabin either about an axis perpendicular to the track plane (a yawing movement) or about an axis parallel to the direction of movement (roll) or about an axis at right angles to the foregoing two (hunting movement).

The inequalities between the forces transmitted at a given time make it necessary to provide wheels of larger diameter when the movable blocks are in the form of trolleys or larger air chambers when the movable blocks are in the form of pneumatic-lift slides. In either case, the guide tracks are made more bulky, heavier and more expensive.

Also, the variations in these inequalities in time result in irregular movements of the cabin, and this has a very adverse effect on passenger comfort.

The object of this invention is to obviate the above disadvantages and provide a suspension enabling a vehicle to be suspended from movable blocks connected to a track, such suspension to provide a substantially equal distribution of the forces transmitted by the suspension to each of the blocks, correction of the vehicle trim and relative lateral and longitudinal clearances between the vehicle and blocks and their shock-absorption. Consequently, it will allow the use of vehicles of considerable length relatively to the minimum radius of the track curves.

According to the invention, the suspension system for a vehicle guided by a track, and comprising firstly a succession of blocks, such as slides or trolleys of a number greater than two, said blocks being movable along the said track and at least some being provided with propulsion means, and secondly a cabin disposed beneath the track and attached to said movable blocks by suspension members, there being at least two suspension members per block, and by resilient members, is characterised in that said resilient members each comprise a deformable chamber containing a fluid under pressure and means are provided to obtain a given distribution of the pressure of said fluid between at least two of the said deformable chambers.

With this system, the guidance and lift forces arising from contact of the track and movable blocks, and transmitted to the cabin via the latter, may be distributed appropriately between them. Conversely, the forces applied directly to the cabin, more particularly as the result of its weight, inertia with respect to acceleration and deceleration, its aerodynamic drag, the transverse component of the wind velocity, and which are transmitted to the track through the agency of the movable blocks, can be distributed appropriately over the track along the entire length of the vehicle.

Of the results of these fundamental properties of the system, the following should be emphasised:

1. The distance — in horizontal projection — between the points of attachment of the suspension means firstly to the movable blocks and secondly to the cabin may be increased without any risk of unbalance for the movable blocks and without any risk of dangerous forces on the suspension means.
2. The movable blocks forming part of a vehicle always operate under comparable conditions even if there are more than two of them.
3. It is therefore possible without disadvantage to suspend one cabin from four or more movable blocks, which then make a kind of caterpillar track, the end units of which have an appreciable transverse clearance with respect to the parts of the cabin suspended therefrom.
4. The splitting up of the movable blocks forming part of a given vehicle enable longer vehicles to be used at will over a given track or else given vehicles on a track having tighter bends.
5. During travel, the cabin can occupy positions which are farther away from its position of equilibrium at standstill and it is possible to give it at each time the most favourable position as regards passenger comfort.
6. In bends, the transverse profile of the track can be kept horizontal or, in other words, super-elevation can be avoided, thus resulting in appreciable reduction of the cost of the track by eliminating skew supporting surfaces.

In the preferred embodiment of the invention, the resilient members are of two types:

a. Those of the first type comprise deformable chambers whose deformations are associated with the relative movements of the movable blocks and of the cabin in the vertical directions; these members are usually in the form of bellows.

b. Those of the second type comprise deformable chambers whose deformations are associated with the relative movements of the movable blocks, and of the cabin in the transverse direction; these members are usually in the form of jacks.

There is therefore complete independence between the vertical suspension of the cabin and the absorption of the transverse reaction, so that these factors can be controlled for maximum passenger comfort.

The members of either type form four groups, which are symmetrical in pairs with respect to the central longitudinal plane and with respect to the central transverse plane of the vehicle, and the most favourable distribution of the fluid pressures is obtained on the one hand inside each group and on the other hand between the groups in pairs. The means used for this purpose comprise calibrated valves, calibrated orifices, and more particularly three-way valves, which can, inter alia, be controlled by a pendulum device sensitive to the inclination of the cabin and to the inertia forces resulting from the movement of the vehicle.

In a first embodiment, the suspension members are articulated on each movable block about a transverse pivot and at each pair of suspension members the cabin bears a runway in contact with rollers allowing lateral clearance of said cabin.

In a second embodiment, the suspension members are connected on the one hand to the movable blocks and on the other hand to the cabin by articulations such as swivel joints whereby the cabin can assume the most satisfactory orientation during the movement of the vehicle.

Other features of the invention will be apparent from the following description.

Specific embodiments of the invention are illustrated in the accompanying drawings solely by way of example without limiting force.

FIG. 1 is a diagrammatic side elevation of a vehicle according to the invention.

FIG. 2 is a diagram in horizontal projection showing the relative positions of the different parts of the vehicle when the track supporting it is curved.

FIG. 4 is a partial vertical section to an enlarged scale on the line IV—IV in FIG. 3.

FIG. 5 is a similar section to FIG. 3 showing the top part of a vehicle constructed according to a second embodiment.

FIG. 6 is a partial vertical section on VI—VI in FIG. 5.

FIG. 8 is a plan view of a double three-way valve having a pendulum control system.

FIG. 9 is a vertical section on the line IX—IX in FIG. 8.

FIG. 10 is a partial transverse elevation of a variant of the suspension system shown in FIG. 5.

FIG. 11 is a similar view to FIG. 10 with a partial vertical section of another variant of the suspension system shown in FIG. 5.

Referring to FIG. 1, a cabin 1 is attached to four movable blocks 11, 21, 31, 41 by four pairs of suspension members 12–13, 22–23, 32–33, 42–43, the projections of the two suspension members of a pair on to the plane of the Figure being coincident. The movable blocks 11, etc., at least some of which are provided with conventional propulsion means P, move along a track 2, for example in the direction of arrow F. The inclination of the suspension members 12–13, etc., is due to the resistance of the air to the movement of the cabin 1. The fact that the projections of the suspension members of a pair coincide indicates that the section of the track 2 over which the vehicle moves is in a straight line.

FIG. 2, on the other hand, shows a case in which the track 2 denoted by a single broken line has the shape of an arc of a circle of radius R. In this case, the cabin 1 has a lateral clearance relative to the four movable blocks 11, etc., particularly at the two end blocks 11 and 41. This clearance results in a difference in inclination both longitudinally and transversely between the suspension members of a pair, e.g., 12–13, and between the pairs of suspension members of two movable blocks, e.g. 12–13 and 22–23. It will immediately be apparent that if the cabin is secured to more than two movable blocks of a short length relative to the cabin length L, the vehicle can be made to negotiate curves of relatively small radius R relative to L, and this is an advantage particularly in the case of urban transportation vehicles. the vehicle shown in FIGS. 1 and 2 comprises four movable blocks, but there could be a greater number, preferably an even number, for example six. An increase in the number of movable blocks also results in an increase in the number of suspension members, so that the suspension forces to which the cabin is subjected can be distributed between a larger number of points of attachment and a lighter construction can be used for the cabin.

The diagrams shown in FIGS. 1 and 2 are particularly applicable to cases in which the movable blocks 11 etc are slides which are lifted and guided by a vacuum device in accordance with the inventor's patents cited hereinbefore. These pneumatic slides must be of a short length relative to the radius R of the tightest curves of the track 2 so that the bearing surface of the track — to which the admissible vehicle load is proportional — can be utilized to the best advantage. The invention, however, also has advantages over known systems in which the movable blocks are trolleys moving on rails.

Figure 3:
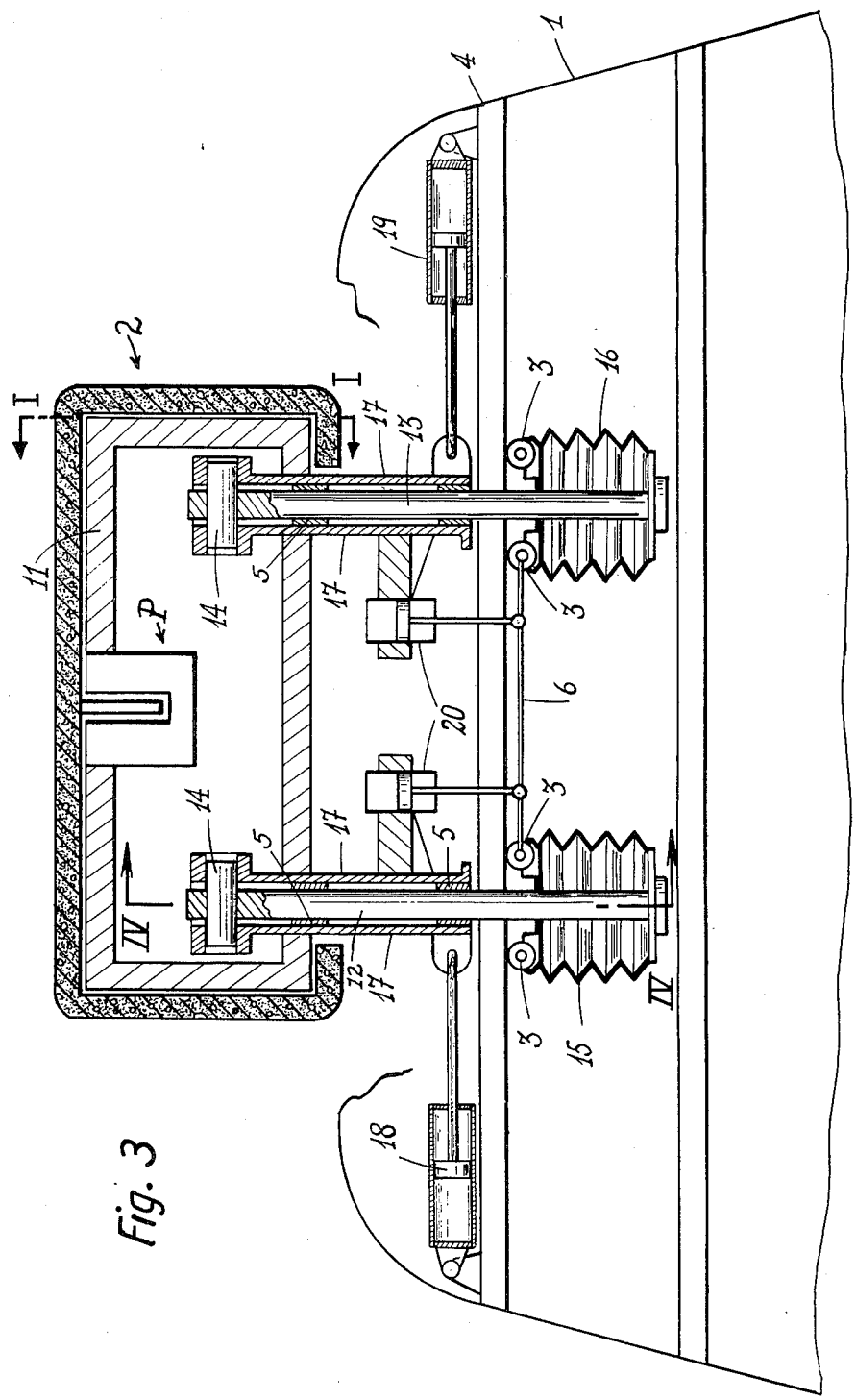
FIG. 3 is a vertical section to an enlarged scale on the line III—III in FIG. 1 showing the top part of a vehicle constructed according to a first embodiment of the invention.

FIG. 3 is a cross-section of the top part of a vehicle in which the suspension members 12 and 13 are articulated on the movable block 11 about pivots 14 perpendicular to the longitudinal central plane of said block. Beneath the ceiling of the cabin 1 a bellows 15 or 16 is secured to the bottom part of each suspension member and is filled with a pressure fluid, e.g., compressed air, and has the corresponding suspension member passing through it. The top of each bellows bears rollers 3 against which bears a runway 4 which is connected to the cabin and is perpendicular to the central longitudinal plane thereof; the rollers 3 could alternatively be replaced by skids — without departing from the scope of the invention — and the runway 4 would then be replaced by a slideway. The pivots 14 are preferably at the level where the thrust of the propulsion means of the movable block 11 is operative.

Two guides 17 are disposed on either side of each suspension member and are formed by plane elements secured to the movable trolley 11 and parallel to the central longitudinal plane of the vehicle. These guides extend from the pivot 14 of the suspension member 12 to a higher level than the top surface of the runway 4. The suspension member guide system is completed by rings 5 surrounding the suspension members 12 and 13 and in easy-running frictional contact with the guides 17, and by semi-resilient stops 7 which are visible in FIG. 4 and which limit the amplitude of oscillation of each suspension member on either side about its pivot 14.

Compressed air jacks 18 and 19 act in a substantially horizontal direction in the vertical plane containing the pivots 14, and connect the top part of the cabin 1 to the guides 17, the cylinder of each jack being connected to the cabin and the end of the piston rod or movable diaphragam of each jack being connected to one of the guides.

Two shock-absorbers 20, preferably hydraulic, supported by brackets connected to the guides 17 are also connected by a common linkage 6 to one of the rollers 3 borne by each of the bellows 15 and 16. A communication (not shown in FIG. 3) may be made between the cylinders of these shock-absorbers to equalize the pressures in either of them.

Finally, the bellows 15 and 16 on the one hand, and the jacks 18 and 19 on the other hand, are connected, as will be explained hereinafter, to a compressed air tank 52 by circuits which are not shown in FIG. 3.

Generally, the forces directly applied to the cabin 1 — for example its weight, the air resistance and the action of the wind, and the inertia forces that it offers to longitudinal and transverse accelerations to which it is subjected, tend to produce stray movements of three types already mentioned hereinbefore:
a. Roll movements, causing the cabin to rock on either side of its transverse equilibrium position.
b. Pitching movements, in which the front and rear of the cabin lift alternately.
c. Yawing movements, in which the front and rear of the cabin move alternately on one side and other of the track.

The suspension system according to the present invention is intended to facilitate guidance of the vehicle on the track while opposing these various stray movements or at least rendering them such that the cabin passengers have the maximum possible comfort.

In the embodiment described with reference to FIG. 3, a rolling movement will result in different compression of the bellows according to which side of the track 2 they are situated, e.g., 15 and 16; pitching results in different compression of the bellows depending on whether they are associated with a movable block situated at the front of the vehicle, e.g., 11, or a block situated at the rear of the vehicle, e.g., 41.; yawing results in a different penetration of the diaphragm into the cylinder of each jack, e.g., 18 or 19, depending on whether it is on one side of the track or the other and whether it is at the front or rear of the vehicle. It will immediately be apparent that if the admission of compressed air to each of the bellows and jacks is suitably varied it is possible to neutralise the stray movements of the cabin 1 and progressively return the latter to its position of equilibrium on leaving a curve in the track. The control means used will be described hereinafter with reference to FIG. 7.

In a second embodiment of the invention illustrated in FIGS. 5 and 6, the suspension members 112, 113 etc are connected on the one hand to the cabin 1 and on the other hand to the movable blocks 11, etc., through the agency of swivel joints which enable them to oscillate both longitudinally and transversely relatively to the vehicle and the bellows 115, 116 are disposed at the top of the corresponding suspension members.

Each suspension member, e.g., 112, is mounted slidably in a casing 114 clamped at the top in a first swivel joint 101, the support of which is fixed to the bottom wall of the movable block 11. The top end of the casing 114 has an annular stop 105 provided with a gasket and supporting one of the ends of the bellows 115. The other end is supported by a shoulder 106 situated at the top end of the suspension member 112 and provided with a semi-resilient lining. In the event of deflation of the bellows 115, the shoulder 106 would come into the immediate proximity of the annular stop 105.

The bottom end of the suspension member 112 is connected by a fork 107 to a second swivel joint 102, the support of which is secured to the cabin roof; the casing 114 also has an annular stop 108 at the bottom end, and this comes into contact with the fork 107 if the distance between the roof of the cabin 1 and the bottom wall of the movable block 11 decreases to a given limit.

Referring to FIG. 5, the quadrilateral defined by the centres of the swivel joints 101, 102, 104 and 103, and of which the sides 101–102 on the one hand and 103–104 on the other hand have varying lengths depending upon the respective position of the cabin 1 and of the movable block 11, assume a skew shape when the track is curved; this will be clearly seen in FIG. 2, in which the pairs of suspension members such as 12–13 appear in horizontal projection. In this case the centers of the swivel joints 102 and 104 are outside the transverse plane passing through the centers of the swivel joints 101 and 103.

The embodiment of the suspension shown in FIGS. 5 and 6 also comprises compressed air jacks 118 and 119 which play a similar part to the jacks 18 and 19 shown in FIG. 3, except that the jacks 118 and 119 have a common body 120 and act via piston rods 121, 122 and swivel joints, of which the swivel members 123 and 124 respectively clamp the casings of the suspension members 112 and 113.

The front surface and the rear surface of the jack body 120 bear rollers 127 (see FIG. 6) which are movable in apertures 126 formed in the walls of a cage which forms the support 125 of the double jack 118–119. The apertures 126 have an elongate shape vertically to the extent necessary to allow the jack body 120 to which the rollers 127 are secured to follow the movements of the swivel joints 123 and 124 resulting from the varying orientation of the suspension members 112 and 113. The support 125 via which the transverse forces are transmitted between the cabin 1 and the movable block 11 is attached to the latter via a cardan suspension formed by a horizontal cross-member 128, the ends of which bear spindles rotating in horizontal bearings 129 secured to the walls of the movable block 11, the central part of the cross-member 128 comprising a vertical bearing 130 in which rotates a spindle secured to the support 125.

FIG. 5 also shows diagrammatically the incorporation on the roof of the cabin 1, of a transverse trim direction valve 63 controlled by a pendulum 68, the purpose of which will be explained hereinafter.

The operation of the complete suspension system according to the invention will now be explained with reference to FIG. 7, which diagrammatically shows the bellows (15, 16, 25, 26 etc) and the jacks (18, 19, 28, 29 etc), the construction of which has been described hereinbefore, for a vehicle comprising four movable blocks 11, 21, 31, 41.

To recapitulate:

a. The two bellows 15, 16 and the two jacks 18, 19 are associated with one movable block 11, the two bellows 25, 26 and the two jacks 28, 29 are associated with one movable block 12, and so on.

b. The shock-absorbers, which are preferably hydraulic (not shown in FIG. 7), may be associated with the bellows as shown in FIG. 3 (references 20) to attenuate the reactions of the said bellows to the forces applied to them, and hence improve the comfort of the suspension. These shock-absorbers may also comprise means whereby the pressure of the fluid they contain can be equalised for two or more of them, so that they react identically to deformations of the bellows with which each of them is associated; these means may simply comprise communication between the chambers containing the fluid.

Figure 7:
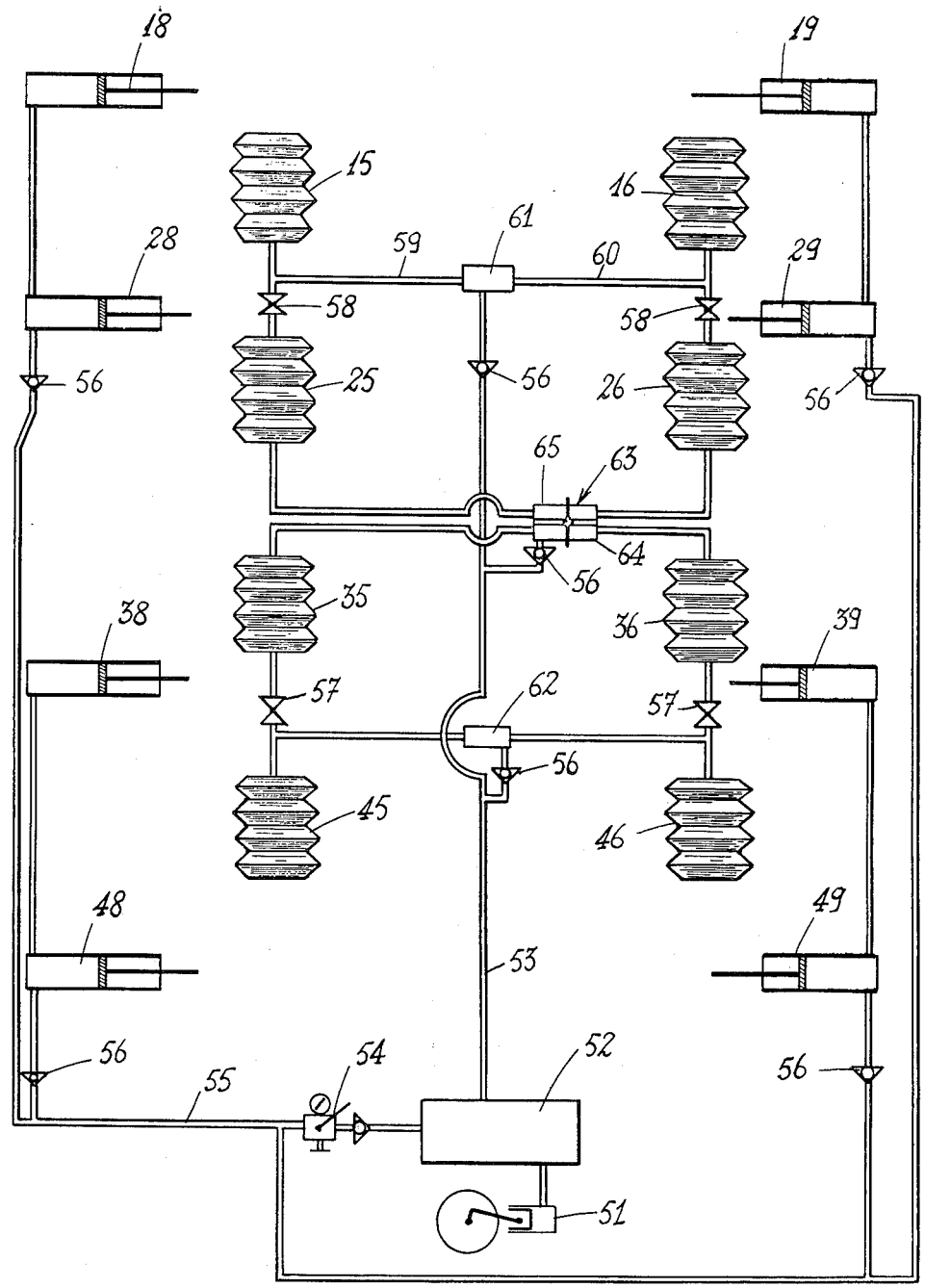
FIG. 7 is a diagram showing the distribution of the pressure fluid in the deformable chambers of a suspension system according to the invention.

FIG. 7 shows an air compressor 51 delivering to a high-pressure tank 52 controlled by a control device of known type (not shown). By way of a conduit 53 the tank 52 directly feeds a high-pressure circuit to which the bellows 15, 16 etc., are connected. By means of a pressure reducing valve 54 and a conduit 55 it also feeds a low-pressure circuit to which the jacks 18, 19 etc are connected.

The jacks which, to recapitulate, are intended to balance the forces exerted laterally on the different parts of the vehicle, are grouped in pairs, each group comprising two jacks, e.g., 18 and 28, situated on one side of the central longitudinal plane and of the central transverse plane of the vehicle. The chambers of the two jacks of each group, e.g., 18–28, communicate directly with one another so that the same pressure is operative and these two jacks exert identical reactions on the two movable blocks 11 and 21 with which they are associated, irrespective of the movements of the cabin 1. The low-pressure circuit also comprises as many branches as there are groups of jacks, e.g., 18–28, and a non-return valve 56 is provided in the said circuit upstream of each group in order to isolate it from the other groups.

The bellows are distributed in the same way as the jacks in groups of two, e.g., 15–25, communication being established between the chambers of the two bellows of the same group in order to distribute the loads equally between the movable blocks. However, the conduit providing this communication may contain a means, e.g., a calibrated orifice 57, to regulate the pressure loss accompanying the transfer of the fluid from one chamber to the other, or else a means such as a calibrated valve 58 to maintain a given pressure difference between the two chambers. In this way it is possible on the one hand to influence the dynamic characteristics of the suspension system end on the other hand the static characteristics.

The high-pressure supply circuit also comprises two three-way valves of known type, or levelling valves. Each is fed by the conduit 53 which is forked for this purpose, a non-return valve 56 being provided in each arm upstream of the said valve. One of them, the front levelling valve 61, feeds via conduit 59 the two bellows 15 and 25 situated on the same side of the central longitudinal plane of the vehicle and forward of its central transverse plane; while it feeds the bellows 16 and 26 via conduit 60. The other, the rear levelling valve 62, acts in the same way in relation to the bellows 35 and 45 on the one hand, and 36 and 46 on the other hand. These two valves enable air to be fed at two different mean pressures, on the one hand to the group of four bellows 15, 16, 25, 26 situated forward of the central transverse plane of the vehicle and, on the other hand, to the corresponding group situated rearwardly of said plane. In this way it is possible to correct the longitudinal trim of the cabin 1 in dependence on the distribution of the loads between the front and rear parts of the said cabin. Each of the valves 61 and 62 is operated by a device of known type which, at each valve, detects the distance between the cabin and the movable block situated above it and which, from this information, acts on the valve in order to return this distance always to a predetermined value.

The high-pressure supply circuit finally comprises a transverse trim correction valve 63, the presence of which was indicated hereinbefore with reference to FIG. 5. This valve, which is shown diagrammatically in FIGS. 8 and 9, comprises two parts 64 and 65 disposed side by side and connected by an imtermediate support 66 containing a horizontal spindle 67 parallel to the track 2. A pendulum 68 is mounted to oscillate on the spindle or pivot 67; its movements about the pivot 67 are determined by the movements of the cabin 1 in the transverse direction and by the inertia forces which its movement produces.

The movements of the pendulum 68 are transmitted by a fork 69 to two spindles 71 and 72 respectively coaxial of the cylinders 64 and 65. Each of them comprises an air inlet 73 connecting with the high-pressure compressed air circuit, a first air outlet 74 communicating with two bellows, e.g., 35 and 45 situated on the left hand side of the vehicle, and a second air outlet 75 communicating with two bellows, e.g., 36 and 46, situated on the right-hand side of the vehicle. Depending upon the movements of the pendulum 68, the compressed air is fed either to the right-hand bellows or the left-hand bellows, the device comprising control means through the agency of which the apparent vertical, i.e., the direction of the resultant of the weight of the cabin 1 and of the inertia forces, is maintained substantially in the central longitudinal plane of said cabin.

FIG. 10 shows a variant of the suspension system of FIG. 5, wherein a suspension member 112 has the bottom end connected to the cabin 1 by a swivel joint 102. The connection between the top end of the said suspension member and the corresponding movable block 11 is made by means of two orthogonal pivots which fullfil the same function as a swivel joint. The first of these pivots 201 extends longitudinally relatively to the vehicle and the bearing which supports it rests on the bottom part of a yoke 202 the top part of which bears two bearings 203 and 204. These bearings each clamp a trunnion 205, 206 which is secured to the bottom wall of the movable block 11, and these two trunnions together define the axis of the second pivot referred to hereinbefore.

In this variant, as in the embodiment shown in FIG. 5, a bellows 115 is interposed between the top end 106 of the suspension member 112 and the orthogonal-pivot joint which connects it to the movable unit 11.

In another variant shown in FIG. 11, the connections of the suspension member 112 to the movable block 11 and to the cabin 1 are of the same type as in the first variant, but the resilience of the suspension in the vertical direction is obtained by means of oleo-pneumatic elements 211 which satisfy the same function as bellows. These elements of known type preferably comprise a variable-volume chamber 212 separated into two compartments by a deformable diaphragm 213. The top compartment 214 is filled with a substantially constant mass of a compressible fluid such as compressed air. The bottom compartment 215 has a throttle 216 provided with a calibrated valve 217 and communicates via a lateral orifice 218 with a supply circuit containing a hydraulic fluid under pressure.

The base of the compartment 215 is movable and is formed by the top surface of a piston 219, the piston rod 220 being articulated about the pivot 201.

Of course the invention is not limited to the above-described embodiments, to which numerous modifications may be made other than those indicated hereinbefore, without thereby departing from the scope of the invention. More particularly, the movable blocks could be in the form of trolleys or bogies mounted on wheels instead of being formed by slides lifted fron the track by a vacuum system.

We claim:

1. In a suspension system for a vehicle hanging from a guiding track, said system comprising guiding units arranged in a line on said track and movable along said track, said suspended vehicle comprising a cabin having at least one rigid section and connected to each of said guiding units through a suspension unit comprising at least a movable link attached respectively to one point of the guiding unit and one point of a rigid section of the cabin, at least some of the suspension units incorporating damping means, resilient tension means, and means to control the tension thereof; the improvement wherein the number of said guiding units is greater than two for said rigid section, and wherein the movable link incorporates bearing means permitting a variation of the distance between the projections of the attachment points of said movable link both in a longitudinal direction and in a transverse direction on a horizontal plane to aid in negotiating curves.

2. A system according to claim 1, wherein the four attachment points of two of the movable links to the moving unit and to the cabin form a deformable quadrangle and wherein the suspension unit incorporates means to vary the length of said movable links and means located at the four corners of the quadrangle to allow free rotation of said links both with respect to the guiding unit and with respect to the cabin.

3. A system according to claim 1, wherein said resilient tension means are attached to the same guiding unit as the movable link concerned.

4. A system according to claim 1, wherein said resilient tension means are attached to the upper deck of the cabin.

5. A system according to claim 1, wherein the movable links concerned with said tension control means are located abreast of each other in relation with the cabin.

6. A system according to claim 1, wherein the movable links concerned with said tension control means are located lengthwise of each other in relation with the cabin.

7. A system according to claim 1, wherein the movable links concerned with said tension control means form a symmetrical arrangement with respect to the longitudinal plane of symmetry of the cabin.

8. A system according to claim 1, wherein the movable links concerned with said tension control means form a fore-and-aft symmetrical arrangement with respect to the cabin.

9. A system according to claim 1, wherein the movable links concerned with said tension control means are arranged in a number of longitudinal rows with respect to the cabin, the tension control means of said movable links being combined with a pitch monitoring device to control the nose-up-or-down attitude of the cabin.

10. A system according to claim 1, wherein the movable links concerned with said tension control means are arranged in a number of rows transversely of the cabin, the tension control means of said movable links being combined with a lateral monitoring device to control the lateral attitude of the cabin.

11. A system according to claim 1, wherein the tension control means comprise equalizing means to provide an equal tension on at least two movable links.

12. A system according to claim 1, wherein the tension control means comprise proportional distribution means to provide tensions in a predetermined ratio on at least two movable links.

13. A system according to claim 1, wherein the tension control means comprise differential means to provide a predetermined difference of tension on at least two movable links.

14. A system according to claim 1, wherein transverse balance means are provided at least on some of said movable links in such an arrangement as to develop a transverse load on said movable links in a direction consistent with the movable arrangement of such suspension members.

15. A system according to claim 14, wherein each of said transverse balance means is attached to the same guiding unit as the movable link concerned.

16. A system according to claim 14, wherein each of at least some of said transverse balance means is arranged abreast of the movable link concerned.

17. A system according to claim 14, wherein each of at least some of said transverse balance means is arranged lengthwise with respect to the corresponding movable link and to the cabin.

18. A system according to claim 14, wherein two transverse balance means are oppositely provided on two adjacent suspension means arranged transversely of the cabin, said movable links being provided with joints allowing a sideways movement of the cabin with respect to the guiding unit concerned, said transverse balance means being arranged to provide sideways directed loads on said movable links relative to the cabin.

19. A system according to claim 14, wherein at least some of said transverse balance means are attached to the upper deck of the cabin, and wherein the attachment of at least one of the movable links concerned with said transverse balance means is combined with a sliding linkage in a parallel arrangement with the corresponding transverse balance means, thus providing a displacement of said movable link relative to the cabin in a direction parallel with the arrangement of said transverse balance means.

20. A system according to claim 1, wherein said tension control means are combined with a general monitoring device to control the attitude of the cabin, detectors being provided to measure the relative position of the cabin with respect to at least one guiding unit.

21. A system according to claim 1, wherein the variable tension means include a system of bellows connected with a pressurized fluid source.

22. A system according to claim 1, wherein the variable tension means include at least one jack comprising a piston and a cylinder connected with a pressurized fluid source.

23. In a suspension system for a vehicle hanging from a guiding track, said system comprising guiding units arranged in a line on said track and movable along said track, said suspended vehicle comprising a cabin having at least one rigid section and connected to each of said guiding units through a suspension unit comprising at least a movable link attached respectively to one point of the guiding unit and one point of the rigid section of the cabin, at least some of the suspension units incorporating damping means, resilient tension means, and means to control the tension thereof; the improvement wherein the number of said guiding units is greater than two for said rigid section and wherein at least two said tension control means are interconnected to aid in controlling the relative position of said rigid section and guiding units.

24. A system according to claim 23 and wherein the movable link incorporates means permitting a variation of the distance between the projections of the attachment points of said movable links on a horizontal plane.

25. A system according to claim 23, wherein said resilient tension means are attached to the same guiding unit as the movable link concerned.

26. A system according to claim 23, wherein said resilient tension means are attached to the upper deck of the cabin.

27. A system according to claim 23, wherein the movable links concerned with said tension control means are located abreast of each other in relation with the cabin.

28. A system according to claim 23, wherein the movable links concerned with said tension control means are located lengthwise of each other in relation with the cabin.

29. A system according to claim 23, wherein the movable links concerned with said tension control means form a symmetrical arrangement with respect to the longitudinal plane of symmetry of the cabin.

30. A system according to claim 23, wherein the movable links concerned with said tension control means form a fore-and-aft symmetrical arrangement with respect to the cabin.

31. A system according to claim 23, wherein the movable links concerned with said tension control means are arranged in a number of longitudinal rows with respect to the cabin, the tension control means of said movable links being combined with a pitch monitoring device to control the nose-up-or-down attitude of the cabin.

32. A system according to claim 23, wherein the movable links concerned with said tension control means are arranged in a number of rows transversely of the cabin, the tension control means of said movable links being combined with a lateral monitoring device to control the lateral attitude of the cabin.

33. A system according to claim 23, wherein the tension control means comprise equalizing means to provide an equal tension on at least two movable links.

34. A system according to claim 23, wherein the tension control means comprise proportional distribution means to provide tensions in a predetermined ratio on at least two movable links.

35. A system according to claim 23, wherein the tension control means comprise differential means to provide a predetermined difference of tension on at least two movable links.

36. A system according to claim 23, wherein transverse balance means are provided at least on some of said movable links in such an arrangement as to develop a transverse load on said movable links in a direction consistent with the movable arrangement of such movable links.

37. A system according to claim 36, wherein each of said transverse balance means is attached to the same guiding unit as the movable link concerned.

38. A system according to claim 36, wherein each of at least some of said transverse balance means is arranged abreast of the movable link concerned.

39. A system according to claim 36, wherein each of at least some of said transverse balance means is arranged lengthwise with respect to the corresponding movable link and to the cabin.

40. A system according to claim 36, wherein two transverse balance means are oppositely provided on two adjacent suspension means arranged transversely of the cabin, said movable links being provided with joints allowing a sideways movement of the cabin with respect to the guiding unit concerned, said transverse balance means being arranged to provide sideways directed loads on said movable links relative to the cabin.

41. A system according to claim 36, wherein at least some of said transverse balance means are attached to the upper deck of the cabin and wherein the attachment of at least one of the movable links concerned with said transverse balance means is combined with a sliding linkage in a parallel arrangement with the corresponding transverse balance means, thus providing a displacement of said movable link relative to the cabin in a direction parallel with the arrangement of said transverse balance means.

42. A system according to claim 23, wherein said tension control means are combined with a general monitoring device to control the attitude of the cabin, detectors being provided to measure the relative position of the cabin with respect to at least one guiding unit.

43. A system according to claim 23, wherein the variable tension means include a system of bellows connected with a pressurized fluid source.

44. A system according to claim 23, wherein the variable tension means include at least one jack comprising a piston and a cylinder connected with a pressurized fluid source.

* * * * *

UNITED STATES PATENT AND TRADEMARK OFFICE
CERTIFICATE OF CORRECTION

PATENT NO. : 3,915,093
DATED : October 28, 1975
INVENTOR(S) : Maurice BARTHALON et al.

It is certified that error appears in the above-identified patent and that said Letters Patent are hereby corrected as shown below:

In the heading of the patent, recite the following:

[32]  Priority    Sept. 7, 1971

[33]             France

[31]             71 32 264

Signed and Sealed this twenty-fourth Day of February 1976

[SEAL]

Attest:

RUTH C. MASON
Attesting Officer

C. MARSHALL DANN
Commissioner of Patents and Trademarks